Aug. 7, 1956   G. A. LYON   2,757,972
WHEEL COVER
Filed Oct. 12, 1953
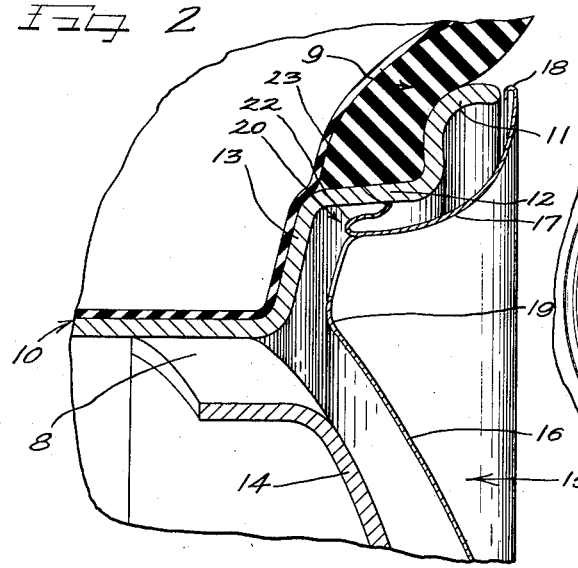
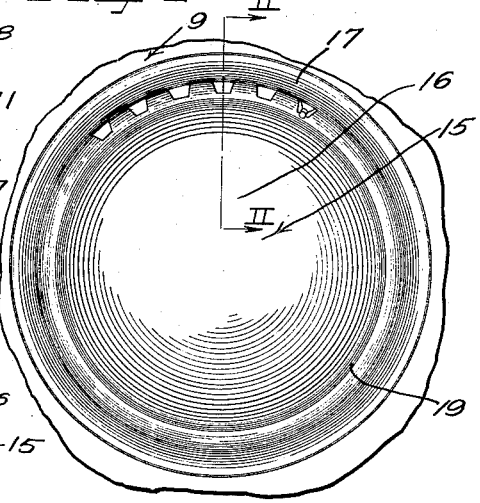
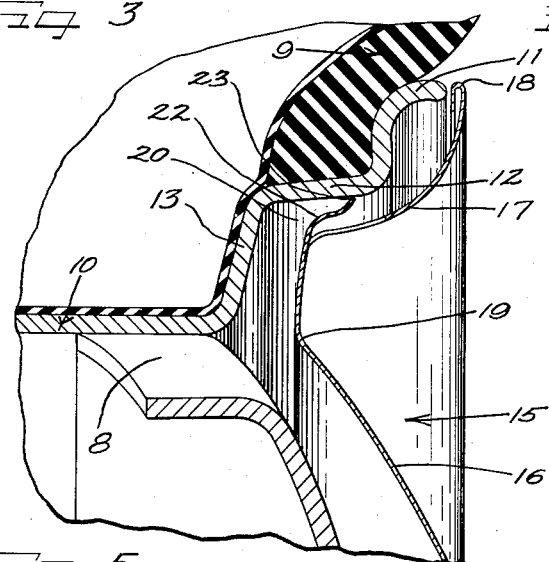
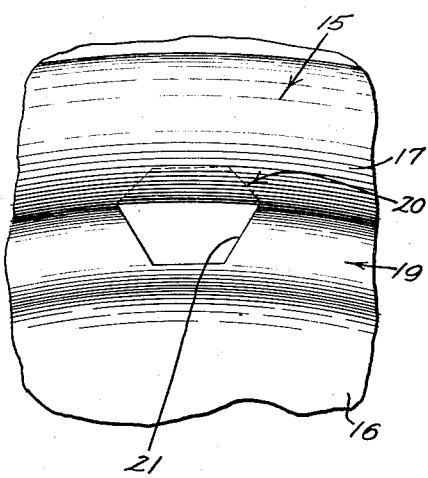
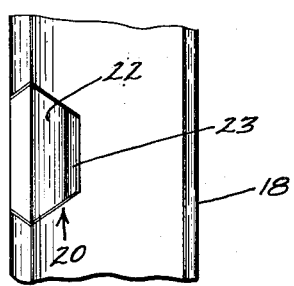
Inventor
George Albert Lyon

United States Patent Office 2,757,972
Patented Aug. 7, 1956

2,757,972

WHEEL COVER

George Albert Lyon, Detroit, Mich.

Application October 12, 1953, Serial No. 385,473

4 Claims. (Cl. 301—37)

This invention relates to a wheel cover and more particularly to a self-retaining automobile wheel cover.

An object of this invention is to provide a simplified form of wheel cover including, as integral components thereof, cover retaining fingers and which may be economically formed on a large production basis by suitable stamping operations.

Still another object of this invention is to provide a sheet metal cover having deflected therefrom, leaving spaced openings in the cover, cover retaining fingers.

In accordance with the general features of this invention there is provided in a cover structure for a wheel, a circular cover member having divergent circular radially outer and inner portions defining a dished annular intermediate area in the cover with the junction of the portions forming the bottom of the area, the member having at the junction a plurality of circularly spaced cover retaining fingers deflected from the material of the cover at the junction leaving openings therein, each of the fingers extending generally radially outwardly and having an angular gripping extremity overlying the rear surface of the outer annular divergent portion axially outwardly of the openings in the junction for gripping engagement with the wheel.

Other objects and features of this invention may more fully appear from the following detailed description taken in connection with the accompanying drawings which illustrate a single embodiment thereof and in which—

Figure 1 is a fragmentary side elevation of a wheel structure having my cover applied thereto;

Figure 2 is an enlarged fragmentary cross-sectional view taken on substantially the line II—II of Figure 1 looking in the direction indicated by the arrows;

Figure 3 is an enlarged fragmentary cross-sectional view similar to Fig. 2 but showing a slight modification;

Figure 4 is an enlarged fragmentary front view of a portion of the cover of Fig. 2 showing an opening left therein by the stamping of the cover retaining finger therefrom; and Figure 5 is a fragmentary rear view of a portion of the cover of Fig. 2 showing one of the fingers formed therefrom and the manner in which it overlies the outer annular portion of the cover.

As shown on the drawings:

In the accompanying drawings there is illustrated a conventional automobile wheel which includes the usual pneumatic tire and tube assembly 9 carried in the customary way upon a multi-flanged drop-center type of tire rim 10. This rim 10 includes a terminal flange 11 joined to an intermediate flange 12 facing generally radially inwardly and projecting generally axially and radially outwardly from a side flange 13 facing generally axially outwardly.

The rim is carried in the customary way on a wheel body or load supporting member 14 having the usual air circulating wheel openings 8.

Cooperable with this conventional wheel is a sheet metal cover designated generally by the reference character 15 embodying the features of this invention. This cover includes a divergent central circular crown and outer annular portions 16 and 17 each of predetermined convex curvature. The outer annular divergent portion 17 terminates at its radially outer, free extremity in a turned pry-off edge 18 spaced from the terminal flange edge so that a pry-off tool may be inserted in such space in the ejection of the cover from the wheel. At the radially inner part thereof, the cover portion 17 extends generally axially and is of a smaller diameter than the intermediate flange 12 to lie in substantially concentric radially inwardly spaced relation therefrom.

The divergent portions 16 and 17 cooperate to define the dished annular intermediate area in the cover defined at its bottom by an intermediate junction portion 19 between portions 16 and 17.

It is from the portion 19 that the cover retaining fingers designated generally by the reference character 20 are formed and deflected from the cover. These fingers 20 may be of any suitable number, such, for example, as sixteen or more, and inasmuch as they are identical, a description of one will suffice for all.

Each of the cover retaining fingers 20 is punched from the intermediate or junction portion 19 leaving a wedge-shaped opening 21 in such portion and by virtue of which each finger 20 has inclined side edges. These openings 21, as shown in Figure 4, are spaced circumferentially about the cover and serve, in addition, to ornament the cover. They also may be used to facilitate circulation of air through the usual wheel openings 8 previously alluded to.

Each finger 20 includes a radially outwardly bent portion 22 that provides a generally axially outwardly extending retaining finger leg overlying but spaced from the rear but generally radially outwardly facing side of the annular outer divergent portion 17. The bent out leg portion 22 has an angular or inclined extremity 23 for cover retaining engagement at their tips with the surface of axial rim flange 12.

It will be noted in Fig. 2 that the gripping engagement of the fingers with the rim flange is disposed directly over but spaced from the rear side of annular divergent portion 17 and axially outwardly of the cover openings 21 in junction portion 19.

The difference in Fig. 3 resides in that the fingers 20 are extended from the radially inner sides of the openings in the cover rather than from the radially outer sides of the openings. In both forms, the fingers extend generally radially and axially outwardly and have the short and therefore substantially stiffer generally radially outwardly obliquely angled retaining terminals 23 that make direct endwise and retaining gripping engagement with the intermediate flange 12 of the tire rim. This type of retaining finger enables gripping of the tire rim without need for any shoulder behind which the fingers can engage, since the resilient longer leg portions 20 of the fingers afford substantial resilience but the short and stiff retaining terminals 23 under the substantial resilient thrust of the leg portions 22 effect a strong gripping retaining action against the tire rim.

In the application of this cover to the wheel, it is first placed over the wheel with the extremities 23 of the fingers generally aligned with the rim flange 12. In this respect, it might be noted that the extremities 23 are normally disposed in a circle of a diameter slightly greater than that of the inner surface of rim flange 12 so as to require flexure as they are brought into engagement with the rim flange.

Continued rearward movement of the cover on the wheel results in a camming engagement of the fingers 20 with the rim flange 12 thereby placing the fingers under resilient stress such that they will retainingly hold the cover on the wheel. Moreover, inasmuch as only the fingers are in engagement with the wheel, the cover is floatingly carried on the wheel by the fingers.

When it is desired to remove the cover from the wheel, the same may be effected easily by inserting the end of a pry-off tool or screwdriver under turned edge 18 and by forcibly loosening the fingers from gripping engagement with rim flange 12.

It will be appreciated that the wheel cover 15 may be made from any suitable sheet metal although it lends itself to economical manufacture on a large production scale from stainless steel strip or coil stock. When the cover is made from stainless steel, by virtue of its cross-sectional contour, it will be found that it lends itself to a highly lustrous and attractive ornamental appearance which can be materially augmented by a simple inexpensive buffing operation.

In addition, by making the cover from stainless steel sheet or strip, the fingers will be possessed of the requisite resilient characteristics to cause them to grip resiliently and properly the rim flange of the wheel when the cover is on the wheel.

I claim as my invention:

1. In a wheel structure including a tire rim having a side flange facing generally axially outwardly and an intermediate flange projecting generally axially and radially outwardly therefrom and facing radially inwardly, a cover for disposition at the outer side of the wheel including radially inner and outer circular portions with one of said portions arranged to lie in substantially concentric radially inwardly spaced relation from said intermediate flange and having thereon adjacent juncture of said cover portions a series of circumferentially spaced resilient retaining fingers extending generally radially therefrom and having generally return bent generally axially outwardly extending retaining finger legs projecting axially outwardly throughout substantially their entire length beyond juncture of the fingers with the cover, said legs being spaced radially outwardly from said one cover portion and spaced radially inwardly from the intermediate flange and radially resiliently deflectable relative to both the cover and the intermediate flange, said legs having short and stiff radially and axially outwardly angled retaining terminals engageable at their tips in retaining gripping press-on, pry-off relation with said intermediate flange, the terminal tips normally lying to a greater diameter than the diameter of the engageable portion of the intermediate flange and thereby being radially inwardly deflected by the retaining engagement with the intermediate flange and thus placing said legs under resilient radially inwardly deflected tension, said cover portions and said retaining fingers being disposed in assembly in confronting relation to the side flange of the tire rim.

2. In a wheel structure as defined in claim 1, the fingers comprising struck out integral extensions from radially outer edges of openings in one of said portions of the cover.

3. In a wheel structure as defined in claim 1, the retaining fingers comprising struck out integral extensions from radially inner edges defining openings in one of said portions of the cover and extending across the openings.

4. In a wheel structure as defined in claim 1 including a wheel body providing at juncture with the tire rim air circulation openings, said cover having openings adjacent to said wheel openings but spaced from the wheel and affording air circulation through the cover and the wheel openings.

References Cited in the file of this patent

UNITED STATES PATENTS

| 2,368,237 | Lyon | Jan. 30, 1945 |
| 2,368,238 | Lyon | Jan. 30, 1945 |

FOREIGN PATENTS

| 1,015,295 | France | Sept. 15, 1952 |